United States Patent [19]

Kümmerer

[11] Patent Number: 4,926,565
[45] Date of Patent: May 22, 1990

[54] END MEASURE, PARTICULARLY STEPPED END MEASURE

[75] Inventor: Hans-Helmut Kümmerer, Tamm, Fed. Rep. of Germany

[73] Assignee: C. Stiefelmayer KG, Esslingen, Fed. Rep. of Germany

[21] Appl. No.: 274,195

[22] Filed: Nov. 21, 1988

[30] Foreign Application Priority Data

Mar. 3, 1988 [DE] Fed. Rep. of Germany ....... 3806791

[51] Int. Cl.⁵ .............................................. G01B 3/38
[52] U.S. Cl. ......................................... 33/567; 33/562
[58] Field of Search ............. 33/783, 501, 567, 567.1, 33/502, 562, 501.06, 501.05

[56] References Cited

U.S. PATENT DOCUMENTS

| 1,563,011 | 11/1925 | Brookes | 33/567 |
| 2,840,916 | 7/1958 | Mueller | 33/567 X |
| 2,853,786 | 9/1958 | Eelstrom | 33/567 |
| 3,162,955 | 12/1964 | Egli | 33/567 |
| 3,775,858 | 12/1973 | Meyer | 33/567 |
| 4,445,276 | 5/1984 | Voneky et al. | 33/567 X |

Primary Examiner—Harry N. Haroian
Attorney, Agent, or Firm—Michael J. Striker

[57] ABSTRACT

An end measure comprises at least one linear support having a longitudinal axis, and a plurality of touching surfaces extending substantially perpendicularly to the longitudinal axis of the support and spaced from one another by predetermined distances, the support being formed as at least one pipe provided with a plurality of plates which are spaced from one another in direction of the longitudinal axis and form the touching surfaces.

25 Claims, 3 Drawing Sheets

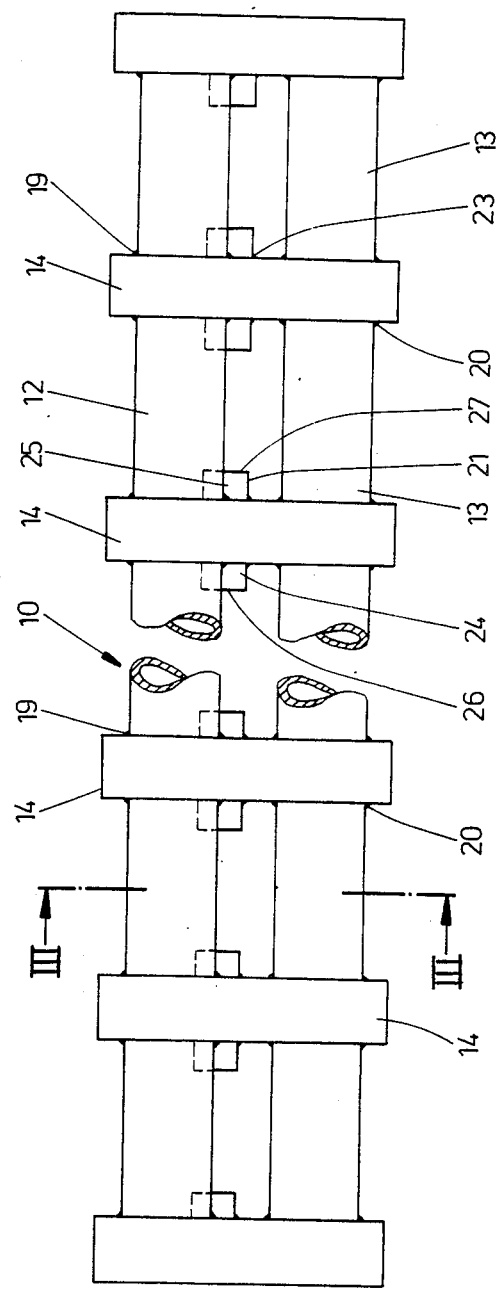
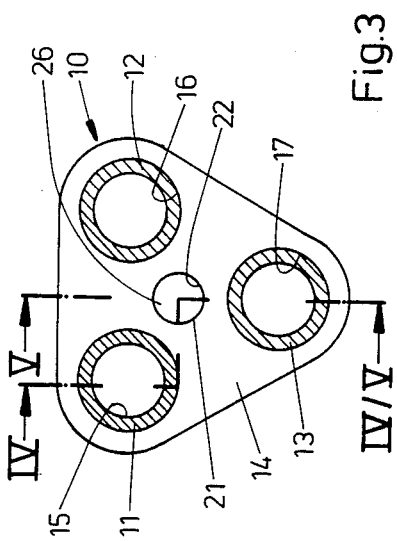
Fig.2
Fig.3

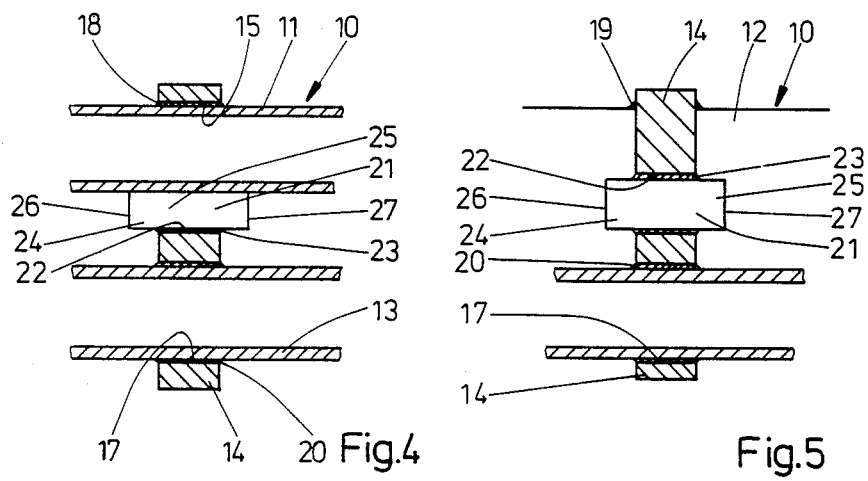
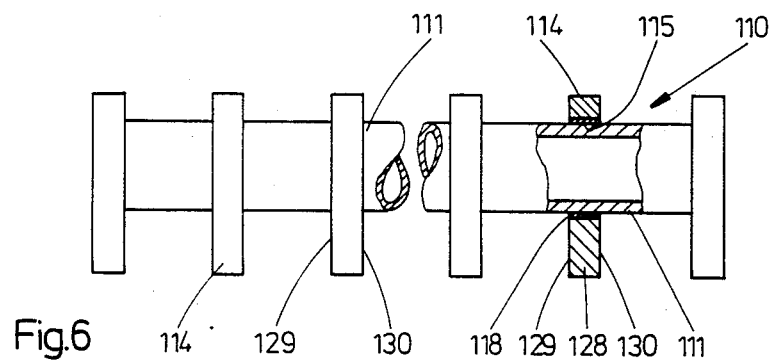
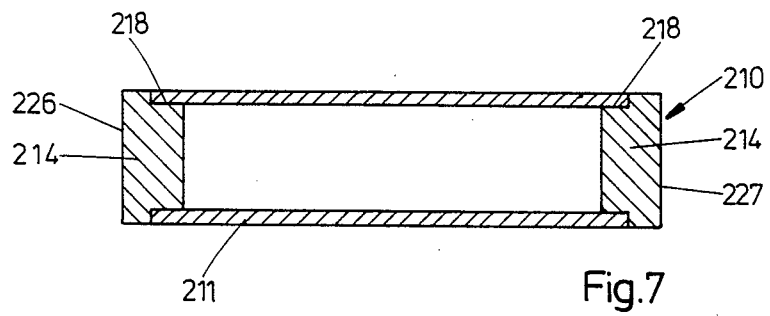

END MEASURE, PARTICULARLY STEPPED END MEASURE

BACKGROUND OF THE INVENTION

The present invention relates to an end measure, and particularly to a stepped end measure which has a support and a plurality of touching or measuring surfaces extending substantially perpendicularly to the support at predetermined longitudinal distances from one another.

Stepped end measures of the above mentioned general type are known in the art. One of such stepped end measures includes a support which is formed as an elongated part with an approximately square or rectangular cross-section having relative great transverse dimensions. It is used in the region of its neutral line and provided there with matching roller bodies which are arranged in predetermined longitudinal distances from one another. Each roller body forms a touching or measuring surface on its one end surface. Such a stepped end measure has many disadvantages. It has an extraordinarily high weight and therefore can be designed only with relatively short measuring lengths. Because of the high weight this stepped end measure is difficult to handle. It is very heavy to carry. The difficult handling must be taken into consideration first of all when service technician must carry such a stepped end measure in a vehicle, take it out of a vehicle and work with it. Another disadvantage a high thermal expansion coefficient. Because of this after transportation of the stepped end measure or after certain time of its use in certain temperatures, a very long calibrating time is required before it can be used again. The measuring reference is not definite, especially when different temperatures take place in machines, devices and the like to be measured. It is also of disadvantage that such a stepped end measure has a high material consumption which involves high costs. In addition, the manufacturing expenses, mounting expenses and calibrating expenses are very high, which further contribute to high cost. Also, the touching surfaces are difficult to reach.

SUMMARY OF THE INVENTION

Accordingly, it is an object of the present invention to provide an end measure of the above mentioned general type, which avoids the disadvantages of the prior art.

More particularly, it is an object of the present invention to provide an end measure which can have greater measuring lengths with a relatively small weight and therefore is easier to handle, for example during transportation.

In keeping with these objects and with others which will become apparent hereinafter, one feature of the present invention resides, briefly stated, in an end measure, especially a stepped end measure, in which the support is formed as at least one pipe which supports a plurality of individual plates spaced from one another in the longitudinal direction and having touching surfaces.

Since the support is formed as a pipe which has a higher bending strength and considerably lower material consumption, an essential weight reduction is obtained. Therefore the end measure can be made with great measuring lengths, for example in the order of 1,500 mm and greater, and at the same time maintain a low weight. The end measure is thereby easier to handle especially during transportation. At least one pipe guarantees a high bending strength and therefore a reduced measuring error. The thermal expansion coefficient is relatively low in a pipe material and reaches zero. Furthermore, the pipe is cost favorable since it can be made from long measured elements and cut to a desired length. This leads to reduced manufacturing and mounting costs, so that the total cost is considerably reduced and the end measure in accordance with the present invention is cost favorable. The individual plates can be designed identically and therefore also cost favorable. This also leads to the fact that the weight of the end measure is relatively low and despite high effective measuring lengths the end measure remains convenient to handle. The touching surfaces are very accessible.

The plates can be connected with the pipe by means of a clamping connection or an adhesive connection.

The plates can be composed of light metal, for example aluminum, steel, carbon fiber reinforced synthetic plastic material, carbon fiber material and the like. They also can be formed as high quality casting parts. The formation of the plates as casting parts of light metal, for example aluminum, and aluminum alloy and the like leads to further reduction of the manufacturing costs for the plates and therefore the total cost.

In accordance with a further feature of the present invention, the pipe can be composed of carbon fiber reinforced synthetic plastic material or carbon fiber material. When the pipe is composed of these materials, an especially low weight is produced with a high bending strength and torsion strength of the pipe. Since such pipes are available as long pre-fabricated articles and can be cut to required length, the material, manufacturing and mounting costs are very low. Such pipes to lead to an extremely reduced weight. Moreover, their thermal expansion coefficient practically is zero.

A further advantageous feature of the present invention is that the plates can have oval, rectangular, four-cornered and especially triangular shape. Thereby the plates can have a special symmetrical configuration, for example a triangular shape in which case the end measure has three pipes. This embodiment has the advantage that the regions between the plates are accessible from all three sides and the touching surfaces are easily reachable even by three-dimensional gauges. It also provides an especially bending-strong and torsion-strong structure.

The plates can be provided with a transverse opening to that the pipe extends through the transverse opening. In this case an especially simply reproducible holding of the plates on at least one pipe is achieved. The mounting expense is reduced.

A further advantageous feature of the present invention is that with rectangular or oval plates, two pipes are arranged symmetrically relative to one another to support the plates. With a four-cornered shape of the plates, four pipes are arranged symmetrically relative to one another to support the plates. The end measure with two pipes or four pipes can have the advantage that the user can select the pipe distances in an advantageous manner so that a good accessibility of the region between the plates and the touching surfaces is insured from all sides.

Since the pipe is composed of carbon fiber reinforced synthetic plastic material or carbon fiber material, the thermal expansion coefficient is practically zero. The end measure therefore can be used with outside temperatures substantially without maintaining a stabilizing time.

The touching surfaces can be formed as end surfaces of pin parts which are transversely offset from the pipe. The pin parts can be formed of one-piece with the respective plates or a separate part attachable to the plates by clamping or adhesive connection. The pin parts can extend outwardly beyond the plate surfaces at one or both ends. The pin parts can be formed also of light metal, for example aluminum, steel, ceramic, glass, carbon fiber reinforced synthetic plastic material, carbon fiber material.

In accordance with a preferable embodiment of the invention, the pin parts are arranged symmetrically relative to several pipes which form a support, and so that they lie on a neutral, bending free line. The advantage of this construction is that the touching surfaces are arranged on the bending-neutral line. The deformations which are conditional to bending therefore cause no errors since the error extends as a cosine error and thereby is neglectable.

In accordance with further features of the present invention, the touching surfaces can be formed as plate surfaces of the plates themselves. It is also possible that the plates are formed as end covers of a single pipe which forms the support.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a schematic side view of the stepped end measure of FIG. 1;

FIGS. 3, 4, 5 are views each showing a schematic section taken along the line III—III in FIG. 2, and along the lines IV—IV and V—V in FIG. 3;

FIG. 6 is a schematic partially sectioned side view of a stepped end measure in accordance with a second embodiment of the present invention; and FIG. 7 is an axial longitudinal section of an end measure in accordance with a third embodiment of the present invention.

DESCRIPTION OF THE PREFERRED EMBODIMENTS

Figure 1:
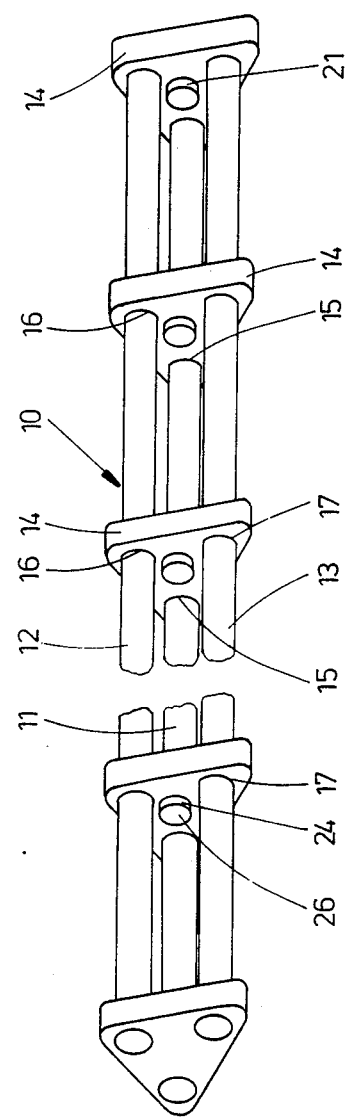
FIG. 1 is a schematic perspective view of a stepped end measure in accordance with a first embodiment of the present invention.

An end measure shown in FIGS. 1–5 is identified with reference numeral 10 and formed as a stepped end measure. It can have a length of for example at least 1,500 mm. The end measure 10 is formed substantially as a rod-shaped linear part which in this embodiment includes three linear supports formed by pipes 11, 12 and 13. The pipes 11, 12 and 13 are arranged in a symmetrical group relative to one another with peripheral angular distances of 120° between them. They are composed of carbon fiber material or a synthetic plastic material reinforced with carbon fibers and identified hereinbelow with CFK. In accordance with another not shown embodiment, the pipes 11, 12, 13 can instead be composed of metal, for example steel or light metal.

A plurality of identical plates 14 are mounted on the pipes 11, 12 and 13 at predetermined longitudinal distances from one another. Each of the plates has measuring or touching surfaces which extend substantially perpendicularly to the longitudinal axis of the whole linear element. The plates 14 as shown in this embodiment are triangular and have rounded corners. Instead, the plates in other not shown embodiments can be oval, rectangular, four-cornered and the like.

The plates 14 are provided with transverse openings 15, 16, 17 for the pipes 11, 12 and 13, respectively. The pipes extend through the associated transverse openings. The transverse openings 15, 16, 17 are spaced by a peripheral angular distances of 120° from one another. They are placed as far as possible in the corner region of the triangle of each plate 14.

The individual plates 14 are retained on the pipes 11, 12 and 13 at equal distances from one another by means of an adhesive connection. The adhesive connection is identified schematically in FIGS. 4 and 5 with reference numerals 18, 19 and 20. A two-component adhesive can be used for example for producing the adhesive connection 18, 19 and 20. Instead of this or additionally to this, the plates 14 can be also clampingly retained on the pipes 11, 12 and 13. It can be advantageous when the plates 14 are composed of light metal, for example aluminum or an aluminum alloy and especially formed as high quality casting parts. In accordance with another, not shown embodiment, the plates 14 are composed instead of steel or another suitable metal material, or for example also from CFK.

A pin part 21 is arranged on each plate 14 and extends at a distance from respective pipes 11, 12 and 13 in a transverse direction. The pin part 21 is formed with respect to the plate 14 as a separate part of its own material. The pin part 21 is fixedly connected with the plate 14. It is mounted in a transverse opening 22 of the plate 14 by means of an adhesive connection 23, which for example can be performed with a two-component adhesive. Instead of this, or in addition to this, each pin part 21 can also be clampingly held in the transverse opening 22.

With the exception of both end plates, in all remaining plates 14 the pin part 21 extends with its both ends 24 and 25 outwardly beyond the respective plate surface. The end surfaces 26 and 27 of these ends 24 and 25 form touching or measuring surfaces.

In both end plates, the pin part 21 extends with its one end over the plate surface and carries at this end a touching or sensing surface, as shown in FIG. 1 for the pin part 21 of the right end plate 14. All pin parts 21 are arranged in the center of the triangle of the respective plate 14, the center formed by the longitudinal center line of three pipes 11, 12 and 13. Thereby all pin parts 21 are arranged symmetrically relative to the three pipes 11, 12 and 13 and so that the pin parts 21 lie on a neutral, bending-free line of the thusly designed stepped end measure. The pin parts 21 can be composed for example of steel, instead of this they also can be composed of light metal, for example aluminum or an aluminum alloy, or also of ceramic, glass or CFK.

In accordance with another not shown embodiment, the pin parts 21 can be formed as integral one-piece parts of the respective plates.

In accordance with another, not shown embodiment, the plates 14 can be not triangular but instead oval or rectangular. In this case the plates are provided with two transverse openings in a symmetrical arrangement, and the stepped end measure then will have two pipes arranged in a symmetrical group and carrying the plates at predetermined distances from one another.

In accordance with a further not shown embodiment, the plates can be formed four-cornered, preferably with rounded corners. In this case transverse openings are provided in all four corner regions for the respective pipes. In such a stepped end measure, four pipes are arranged in a symmetrical group relative to one another, and carry the plates at predetermined distances from each other.

The end measure 10 formed as the above described stepped end measure in accordance with the present invention has first of all the advantage that the respective region between two adjacent plates 14 are freely and easily accessible from all three sides. This is especially important when the end surfaces 26 and 27 which form the measuring surfaces are touched by a three-dimensional gauge with a gauge tip extending outwardly of a housing and transversely engaging these regions of the stepped end measure. Because of the good accessibility from all three sides, a user without difficulties can reach the end surfaces 26 and 27 with such a gauge, without the danger that this gauge collides with the housing parts on the stepped end measure, for example the pipes 11, 12, 13 and thereby block a displacement of the gauge tip to the central region with the end surfaces 26 and 27. An additional advantage is that the stepped end measure has an extraordinarily low weight, despite a very significant structural length, for example 1,500 mm and more to for example 1,800 mm. Even greater lengths are possible with the same advantages of the low weight, however, they are not practical since such long stepped end measures are difficult to pass in the vehicles and form hindrances for storage.

The extremely low weight even in the event of great measuring lengths is provided especially when the pipes 11, 12, 13 are composed of CFK as mentioned hereinabove. Also, when they are composed of steel or light metal, the weight advantage is provided, though to a lower extent. The extremely low weight is achieved when the supports of the measuring surfaces which are formed here as the plates 14 with the pin parts 21, are relatively small, have a thin cross-section and are light. Because of the very small weight, even with great measuring lengths such stepped end measuring rods are easy to handle. They can be carried, lifted and lowered without difficulties, so that a transportation and also the handling of such stepped end measuring rods by a user pose no difficulties. The inventive end measure further has the advantage that the thermal expansion coefficient of such a stepped measuring rod is practically equal to zero. The pipes 11, 12, 13 composed of CFK have a thermal expansion coefficient which is practically equal to zero. The thermal expansion coefficient of the plates 14, is extremely low, and the same is true for the pin part 21. The only effect can be some longitudinal changes in direction of the longitudinal axis of the stepped end measure, which is practically neglectable because of the small thickness of the plate 14 and the pin parts 21. Thereby it is presumed that the thermal expansion coefficient of the whole stepped end measure is practically equal to zero. This means that the stepped end measure can be used in different temperatures and practically provide always the same accuracy. When the stepped end measure must be used sometimes with high temperatures, for example during storage in a service vehicle, no long utilization time is needed before a user can work with this stepped end measure.

Another advantage is also the low manufacturing and mounting costs, whereby the stepped end measure can be very cost favorable. Since the plates 14 have identical shape and dimension, they can produced inexpensively especially as a high quality casting part. Also, the pin parts 21 can be made as elements which are cut from a long material, in a cost favorable manner. The insertion and glueing of the pin parts 21 in the plates 14 can be performed fast and with no problems. The pipes 11, 12, 13, also composed of CFK, are available as premade long products which can be cut to a desired size. This is also very cost favorable. The mounting of the plates 14 and glueing them on the pipes 11, 12, 13 is performed in a fast and simple manner with a reproducible quality, especially when a mounting device is used for respective longitudinal intervals. Thereby in a simple manner a cost-favorable stepped end measure with a high quality can be produced.

A further important advantage of the present invention is that the end surfaces 26 and 27 of all pin parts 21 of the plates 14 which form the touching or measuring surfaces lie on a neutral bending-free line. Thereby the stepped end measure has a bending-neutral construction. An error due to bending of the stepped end measure is a cosinus error in the neutral line because of the arrangement of these touching or measuring surfaces, and thereby it is neglectable. The stepped end measure in accordance with the present invention is especially bending-resistant when the pipes 11, 12, 13 are composed of CFK, since this material has an especially high bending strength. Because of the above described arrangement, the inventive stepped end measure also has a very high torsion strength.

The spaces between the neighboring end surfaces of two pin ends between two neighboring plates 14 are selected in accordance with respective requirements. These spaces can amount to for example 20 mm or more, up to for example 100 mm.

In the end measure in accordance with the present invention it is also possible to couple the individual longitudinal portions of the stepped end measure with one another. Thereby a stepped end measure of a greater length can be produced when needed.

FIG. 6 shows an end measure in accordance with another embodiment of the present invention. The parts of this end measure which correspond to the parts of the end measure of the first embodiment are identified with reference numerals which are higher by 100, to avoid the repetition of description of the same parts.

The end measure with a second embodiment is identified with reference numeral 110 and also formed as a stepped end measure. It has a support which however is formed as one pipe 111. Individual plates 114 are mounted on the pipe 111 at predetermined longitudinal distances from one another in an above described manner. The plates 114 are provided with a transverse opening 115 through which the pipe 111 extends. An adhesive connection 118 is provided in the region of this transverse opening. The plates 114 have, similarly to the first embodiment, touching or measuring surfaces in a transverse distance from the pipe 111. They are formed here on an end region of the respective plates 114 by outer surfaces 129 and 130 of the plates 114. In the second embodiment, the touching measuring surfaces 129 and 130 are not located on the neutral bending-free line. This is here not critical, since for example the pipe 111 is dimensioned as to its outer diameter and wall thickness and formed of such a material for example CFK, that the pipe 111 has a very high bending strength.

FIG. 7 shows an end measure in accordance with a third embodiment. In this end measure, similarly to the second embodiment, the touching or measuring surfaces are formed by the plate surfaces of the respective plates. In accordance with the third embodiment, the end measure 210, in deviation from the second embodiment, is formed as a single end measure. It has a single pipe 211, and plates 214 are formed as end closure covers which match to the pipe 211. The thusly designed plates 214 are formed in the region of their free end surfaces 226 and 227 so that they form the touching or measuring surfaces. For protecting against outer influences, the end side touching or measuring surfaces can be somewhat drawn-in or located deeper in an axial direction.

It will be understood that each of the elements described above, or two or more together, may also find a useful application in other types of constructions differing from the types described above.

While the invention has been illustrated and described as embodied in an end measure, especially a stepped end measure, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An end measure, comprising at least one linear support having a longitudinal axis; a plurality of touching surfaces extending substantially perpendicularly to said longitudinal axis of said support and spaced from one another by predetermined distances, said support being formed as at least one pipe provided with a plurality of plates which are spaced from one another in direction of said longitudinal axis; a plurality of pin parts having ends with end surfaces which form respective ones of said touching surfaces, said pin parts being transversely spaced from said pipe.

2. An end measure as defined in claim 1, wherein said plates are held on said pipe in a clamping manner.

3. An end measure as defined in claim 1, wherein said plates are held on said pipe by an adhesive connection; and further comprising means for providing adhesive connection between said plates and said pipe.

4. An end measure as defined in claim 1, wherein said plates are composed of metal material.

5. An end measure as defined in claim 4, wherein said plates are composed of a metal which is aluminum.

6. An end measure as defined in claim 4, wherein said plates are composed of a metal which is a high quality cast.

7. An end measure as defined in claim 1, wherein said pipe is composed of a carbon fiber reinforced synthetic plastic material.

8. An end measure as defined in claim 1, wherein each of said plates has a triangular shape.

9. An end measure as defined in claim 1, wherein each of said plates has a transverse opening, said pipe extending through said transverse opening of said plates.

10. An end measure as defined in claim 1, wherein said plates have a rectangular shape, said support including two such pipes which are arranged symmetrically relative to one another and support said rectangular plates at predetermined distances from one another.

11. An end measure as defined in claim 1, wherein said plates have an oval shape, said support including two such pipes which are arranged symmetrically relative to one another and support said oval plates at predetermined distances from one another.

12. An end measure as defined in claim 1, wherein each of said plates has a triangular shape, said support including three such pipes arranged symmetrically relative to one another and supporting said triangular plates.

13. An end measure as defined in claim 12, wherein each of said plates is provided with at least three transverse openings which are spaced from one another by peripheral angular distances of 120°, said pipes extending through said transverse openings.

14. An end measure as defined in claim 1, wherein said pin parts each having two ends with end surfaces forming respective ones of said touching surfaces.

15. An end measure as defined in claim 1, wherein each of said pin parts is formed a one-piece integral part of a respective one of said plates.

16. An end measure as defined in claim 1, wherein each of said pin parts is formed as a separate part which is connected with a respective one of said plates; and further comprising means for connecting said pin parts with said plates.

17. An end measure as defined in claim 16, wherein each of said plates has a transverse opening in which a respective one of said pin parts is held so as to form said connecting means.

18. An end measure as defined in claim 17, wherein said transverse opening is formed so that a respective one of said pin parts is clampingly held in it so as to form said connecting means.

19. An end measure as defined in claim 16, wherein said connecting means includes an adhesive which connects said pin parts with said plates.

20. An end measure as defined in claim 1, wherein each of said plates has plate surfaces, each of said pin parts extending with at least one of its ends outwardly beyond a respective one of said plate surfaces so as to form at said end a respective one of said touching surfaces.

21. An end measure as defined in claim 1, wherein each of said plates has two plate surfaces, said pin parts having two ends extending outwardly beyond both plate surfaces of a respective one of said plates and provided at said ends with two of said touching surfaces.

22. An end measure as defined in claim 1, wherein said pin parts are formed of a metal material.

23. An end measure as defined in claim 22, wherein said pin parts are composed of a metal which is aluminum.

24. An end measure as defined in claim 1, wherein said support includes a plurality of such pipes, said pin parts being arranged symmetrically relative to said pipes and so that they lie on a neutral bending-free line.

25. An end measure as defined in claim 24, wherein said support has three such pipes, each of said plates having a triangular shape, said pin parts being located in a center of a triangle which corresponds to a longitudinal central line of said three pipes.

* * * * *